May 28, 1968  E. J. BARTHOLET  3,385,223

ROTARY LIQUID METERING WHEEL

Filed Sept. 8, 1966  3 Sheets-Sheet 1

INVENTOR,
EMIL J. BARTHOLET

BY Watson, Cole,
Grindle & Watson
ATTORNEYS

May 28, 1968  E. J. BARTHOLET  3,385,223
ROTARY LIQUID METERING WHEEL
Filed Sept. 8, 1966  3 Sheets-Sheet 2
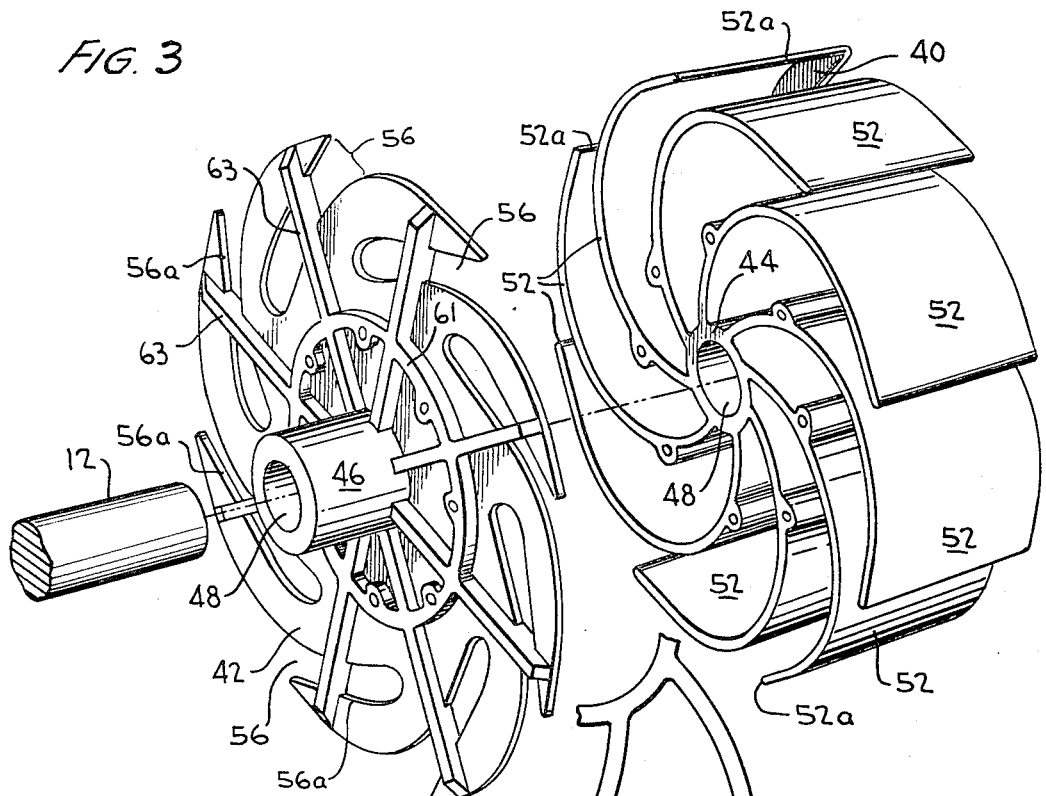
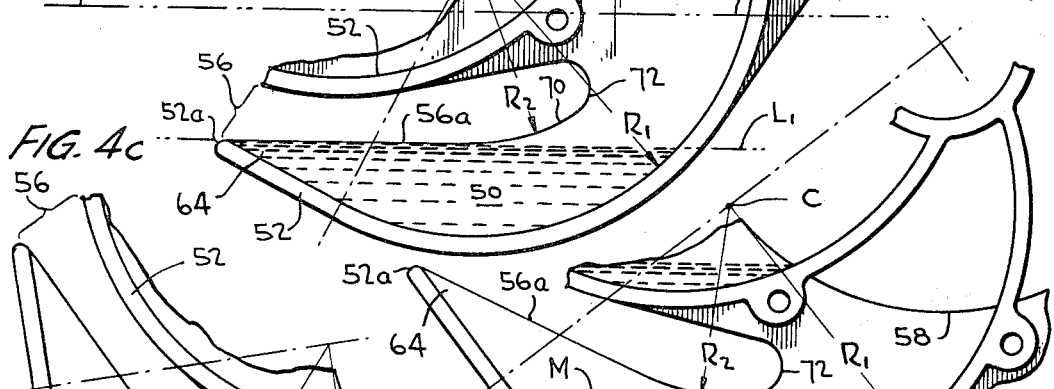
INVENTOR,
EMIL J. BARTHOLET
BY Watson, Cole, Grindle & Watson
ATTORNEYS May 28, 1968      E. J. BARTHOLET      3,385,223

ROTARY LIQUID METERING WHEEL

Filed Sept. 8, 1966      3 Sheets-Sheet 3

INVENTOR,
EMIL J. BARTHOLET

BY Watson, Cole, Grindle & Watson
ATTORNEYS 3,385,223
ROTARY LIQUID METERING WHEEL
Emil J. Bartholet, Leonia, N.J., assignor to Komline-Sanderson Engineering Corp., Peapack, N.J., a corporation of New Jersey
Filed Sept. 8, 1966, Ser. No. 578,062
7 Claims. (Cl. 103—85)

This invention relates to improvements in a rotary liquid metering wheel of the class in which the wheel rotates about a horizontal axis with its lower periphery at least partially immersed in the liquid to be metered. Customarily, such a metering wheel is formed to define a multiplicity of metering cavities or buckets opening through or adjacent its outer periphery to permit inflow of liquid into each bucket in succession as it is immersed in the liquid, then to elevate the liquid contents of each bucket in succession and discharge it through a generally axially-directed discharge port adjacent the rotational axis of the metering wheel.

In prior art devices, the extent to which the buckets were filled depended upon the depth to which the lower portion of the wheel was immersed in the liquid to be metered. Therefore, in order to achieve the desired constant rate of discharge of the wheel, it was necessary to provide means for maintaining the liquid level substantially constant. Normally, such control of the liquid level was through means of liquid-level responsive float valves or the like adapted to control the inflow of liquid to the reservoir or alternatively to provide for discharge of surplus liquid. Such float valves, however, generally permit substantial variations in the liquid level such as to produce inaccuracies in the volumetric rate of discharge of the metering wheel.

The metering wheel of the present invention, on the other hand, is constructed to effect accurate delivery of liquid at a constant volumetric rate responsive to its rotation at any of various constant rotational speeds and despite substantially-wide variations in the level of the liquid in which the metering wheel operates. Thus, the accuracy of the metering wheel may be maintained even with rather faulty liquid level maintaining devices. To achieve this result, each of the metering buckets of the wheel is formed so that, upon emerging upwardly from the liquid incident to rotation of the wheel, it initially contains an over-supply or surplus of liquid, which surplus is accurately drained off during subsequent rotation of the wheel and before the entrapped liquid is elevated to a level in which it communicates with and commences its discharge through the discharge opening or port of the respective bucket.

The invention also contemplates formation of the respective buckets and of their associated overflow or surplus discharge means as to permit the accurate handling and delivery of liquid at a maximum constant volumetric rate having regard to the diameter of the wheel and its angular velocity.

These ends are achieved by so forming each bucket as to have its liquid holding portion of uniform cross-sectional area from its juncture with the outwardly-projecting liquid surplus pickup means to its juncture with the discharge port; by forming the bottom liquid retaining portion of each bucket of a constant arcuate curvature eccentric to the rotational axis of the wheel so as to rotate around its center of curvature during each revolution of the wheel and thereby to convey the entrapped liquid contents from the intake end to the discharge end of the bucket. Also, the overflow opening has a metering edge located radially inwardly from and concentric to the bottom of each bucket to permit a constant and complete overflow or surplus liquid from the bucket throughout a substantial portion of the rotary movement of the bucket and before the entrapped liquid communicates with the discharge opening.

Also, in accordance with the invention, it is made possible to achieve a substantially-constant rate of discharge of the liquid from the wheel throughout each revolution thereof with but minimum fluctuations from the discharge from successive buckets. This is achieved by so correlating the depth of the metered charge of liquid in each bucket with the angular extent of the arcuate bucket bottom occupied thereby as well as with the angular distance between successive buckets as to achieve a slight overlap in the discharges of successive buckets.

In the accompanying drawings, there is illustrated a preferred exemplification of the invention, though it will be appreciated that various features and details may be altered or omitted without departing from the inventive concepts as above broadly outlined and as defined in the appended claims.

In the accompanying drawings:

FIGURE 3 is an exploded perspective view of the metering wheel and a portion of its shaft;

Figure 1:
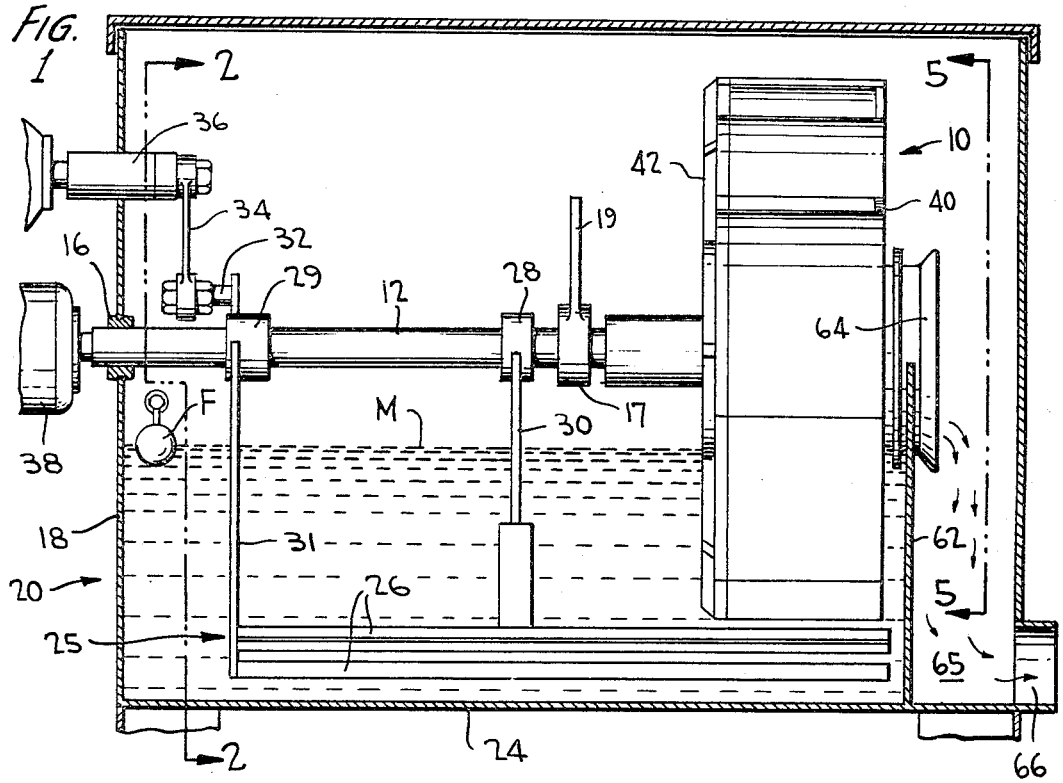
FIGURE 1 is a vertical section through a typical liquid metering unit employing the metering wheel of the invention, unnecessary parts being broken away.
Figure 2:
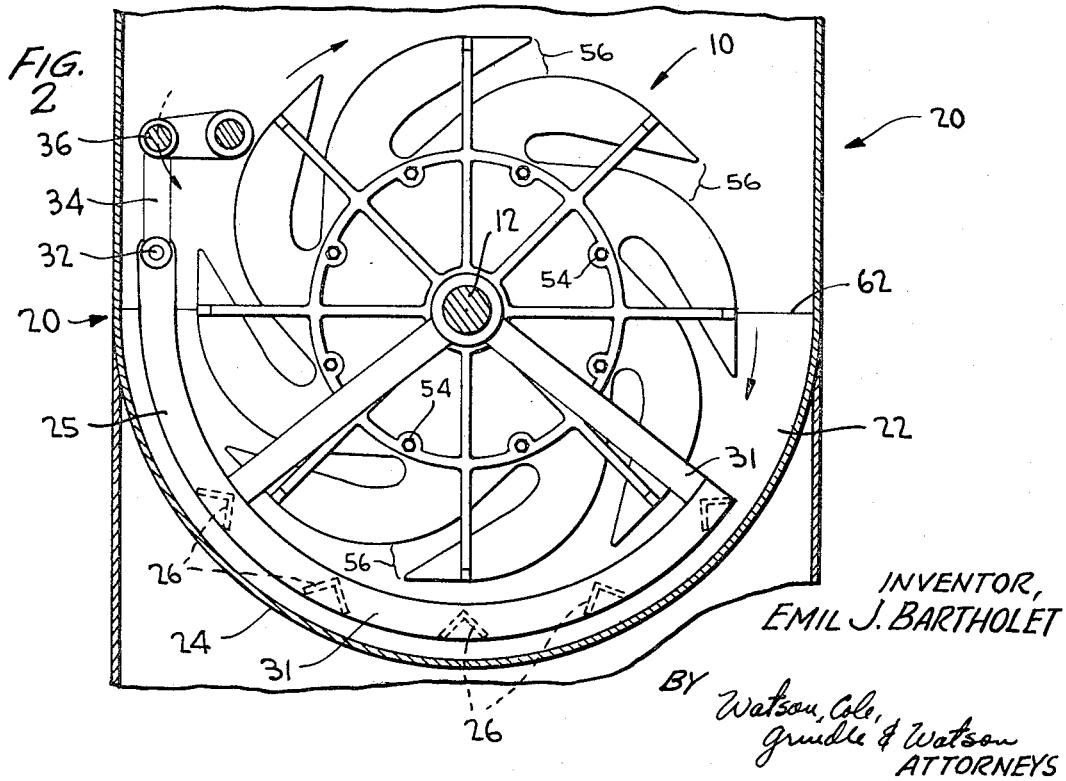
FIGURE 2 is a section on the line 2—2 of FIGURE 1.
Figure 6:
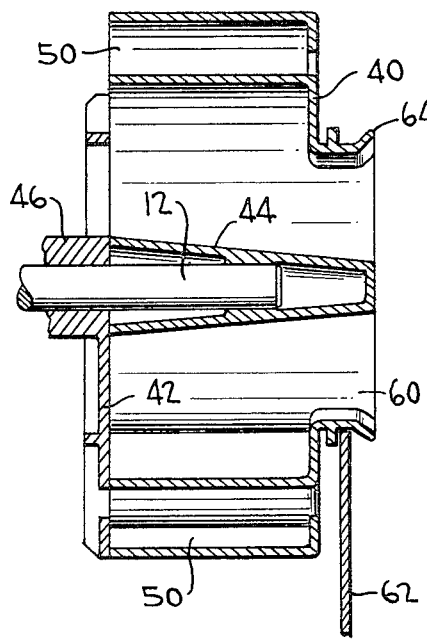
Figure 5:
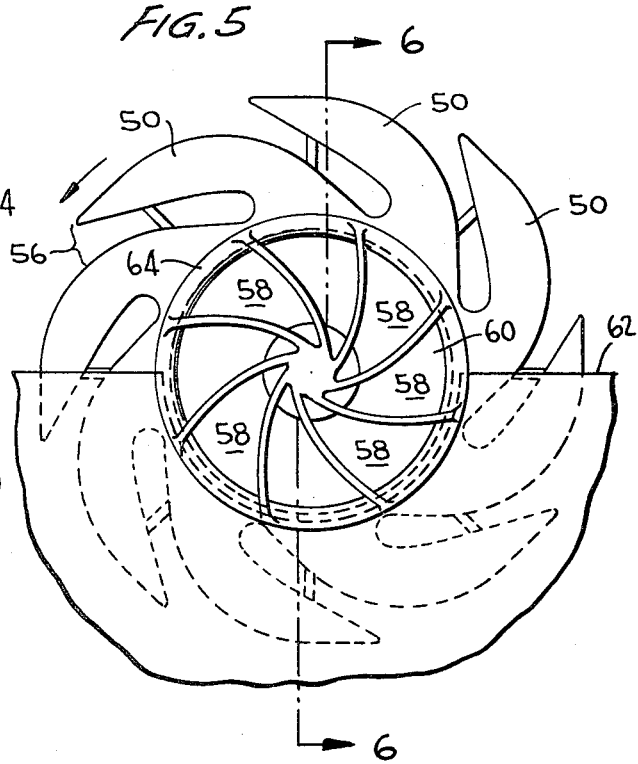

FIGURES 4a, 4b and 4c respectively are views of a given bucket in successive angular positions of the metering wheel, in which respectively the bucket is initially filled with a surplus of liquid, then said surplus is caused to overflow, and finally the accurately-metered volume of residual liquid commences its discharge from the bucket;

FIGURE 5 is a fragmentary view, partly in elevation and partly in section on the line 5—5 of FIGURE 1; and FIGURE 6 is a section on the line 6—6 of FIGURE 5.

Referring now in detail to the accompanying drawings, and first referring to the structure shown in FIGURE 1, there is illustrated in this figure, in more or less diagrammatic manner, one of the various ways in which a metering wheel of the invention may be employed for metering liquid from a tank or reservoir for discharge at a carefully-metered rate.

Thus, in FIGURE 1, the metering wheel 10 is supported for rotation on a generally-horizontal shaft 12 to the free end of which it is coaxially affixed so that rotation of the shaft will transmit rotary movement to the wheel. The horizontal shaft extends and is rotatably supported by bearings 16 and 17, the bearing 16 being supported by the end wall 18 of a housing 20, and bearing 17 being carried by a bracket 19 affixed to a wall of the housing. The housing 20 defines a reservoir 22 for the liquid or fluid material M to be metered, and the lower periphery of the wheel is partially imersed in liquid material M which is retained in the reservoir 22 at a roughly-pre-determined or constant level by means such as a conventional float valve F controlling the supply of liquid to the tank from any suitable source.

It will be understood that the liquid material M in the reservoir is picked up by the rotating wheel and discharged in carfully-measured increments through a spout 64, into a compartment 65 for delivery through a port 66 to its intended destination.

In the embodiment here exemplified, the liquid reservoir is provided with a generally semi-cylindrical bottom 24 concentric to the shaft 12, and there is provided a suitable oscillating agitator means 25 including a plurality of agitating bars 26 extending parallel to the axis of the shaft 12 and supported therefrom for oscillation about the shaft as by means of the bearings 28, 29 and the quadrant-shaped frame members 30, 31 suspended from such bearings, as shown. It will be noted that these bars 26 have free ends which project beneath the metering wheel 10 so that agitation may be effected substantially throughout the length of the reservoir.

Oscillating motion is imparted to the agitator through a crank pin 32 on one of its supporting frame members 31 eccentrically to the metering wheel shaft 12. This crank pin is operatively connected by the pitman 34 to an eccentrically-located crank pin 36 of a suitable rotary drive means (not shown), it being understood that various suitable power drive means are available and readily adaptable for this purpose. Similarly, it will be understood that conventional means may be employed for rotating the shaft 12 and metering wheel 10 at any of various preselected constant speeds which will, in known manner, govern the rate of discharge of materials from the metering wheel. In view of the well known nature of several variable speed drive means suitable for the purpose, there is illustrated only a portion of such means, namely the variable speed transmission 38, the output of which is coupled to the meter wheel drive shaft 12.

The foregoing structure is but generally disclosed, simply by way of illustration of the background and environment under which such a metering wheel typically operates. It will be readily appreciated that the float valve F here illustrated for maintaining the liquid level in the tank is incapable of maintaining an exact level of the liquid within reservoir 22. Unless it is of a quite expensive and complicated structure, it will permit rather substantial variations in the liquid level, and such variations may occur in any event should the float valve become clogged, maladjusted, or otherwise imperfect in its operation. Under such circumstances, the output of the metering wheel would normally be expected to vary in accordance with changes in the liquid level so that the output of the metering wheel might be expected under certain circumstances to deviate substantially from its calculated and intended output. To overcome this specific defect, the metering wheel of the invention employs certain novel structural features as best illustrated in other figures of the drawings.

The metering wheel will thus be seen to comprise a pair of relatively axially-spaced end discs 40, 42 respectively having central hub portions 44, 46 jointly defining a socket 48 by which the metering wheel is assembled and supported on the free end of the shaft 12 for rotation therewith.

A plurality of similar buckets, each designated 50, is defined in the wheel by a plurality of generally-spiral vanes 52 sub-dividing the space between the end plates. The plurality of liquid-entrapping and conveying buckets 50 thus formed are of identical size and conformation and arranged concentrically to the rotational axis of the wheel. In the accompanying drawings, the wheel 10 is intended for rotation in a clockwise direction, and accordingly the radially-outer ends of the respective vanes 52 are angularly displaced in a forward direction from the radially-inner ends thereof with regard to the direction of rotation.

Although the specific manner of forming and assembling the wheel parts is inessential to the invention, it will be noted that, in the present instance, the wheel is adapted for formation of metal by conventional metal pouring and molding practices. Accordingly, it has been found practical to form the vanes 52 as integrally-molded portions of the forward or discharge end disc or plate 40 and to secure the separately-molded end disc 42 in assembled relation thereto by conventional bolts 54 or the like. The space between the outwardly-directed free end portion of each vane and an immediately-adjoining vane defines an inlet or radially outwardly-opening mouth 56 to function as an intake opening for the bucket of which such vane constitutes a bottom and of which the respective end plates 40, 42 or portions thereof constitute the opposite sides. At their radially-inner end portions, the respective buckets 50 communicate with discharge openings 58 disposed in annular formation around the hub and being generally in the form of separate sectors of an annular discharge port 60 concentric to the hub and arranged to discharge liquid from the buckets over the end wall 62 of the reservoir. As shown in FIGURE 3, the end plate or disc 42 is imperforate between its hub 46 and the inner ends of the bucket mouths 56, and preferably is provided with annular and radial reinforcing ribs 61 and 63 respectively, the latter extending across the respective mouths 56.

The discharge port 60 is preferably defined by an annular flange 64 projecting axially outwardly from the discharge end disc 40 and across the reservoir end wall 62 to convey and discharge the liquid thereover for discharge through the passage 66 and outlet 68 (FIGURE 1). Preferably, the discharge spout is received and rotatably supported in a generally semi-circular bearing depression or portion in the upper edge of the reservoir end wall 62.

Referring now more specifically to the form and arrangement of the individual buckets 50 as best shown in FIGURES 3 to 6, it is to be noted that these are of identical structure and configuration and, therefore, detailed description of but a single bucket is equally applicable to all. Thus, the vane 52 which defines the bottom of each bucket in the preferred embodiment is of uniform arcuate curvature about a center of curvature C, eccentric to the rotational axis of the wheel except as to its free end portion. The free end portion of the vane merges with and projects generally tangentially from the main body of the vane to coact with the adjoining portions of the end discs 40 and 42 to provide a radially-projecting scoop 64 adjacent the mouth 56 of each bucket 50.

The intake mouth or opening 56 of the bucket is further defined by parallel generally inwardly-directed rectilinear slots in the respective side or end discs 40, 42, with the lower edges 56a of such slots in a common plane with the end edge 52a of the vane, to define the upper edge of the bucket. The arrangement is such that, when such edges 56a of any given bucket are in a horizontal position during rotation of the wheel, and the liquid within the tank is at an appropriate level no lower than the mouth thus defined, the liquid will flow into and fill the bucket at least to the level of the edges, substantially in the manner shown in FIGURE 4a of the drawings.

It is important to note that, when each such bucket is rotated to such a position with its upper edges horizontal and is filled with liquid, the tangentially-projecting outer end scoop portion 64 of its vane or bottom 52 and correspondingly projecting portions of its opposed side walls 40, 42 will define a radial extension of the bucket which, in approximately the horizontal position of the bucket edges 52a, 56a, increases its liquid holding capacity over that which it would have if its bottom vane were maintained at uniform arcuate curvature completely to its outer end edge. This is best illustrated in FIGURE 4a of the drawings wherein the excess volumetric capacity thus initially added to the bucket by the scoop 64 is indicated in broken lines. The additional capacity thus provided in each bucket represents a uniform excess or surplus of liquid with which each bucket in turn is initially charged at or about the time it commences elevating its entrapped liquid above the level of liquid within the reservoir. It is thus insured that each bucket in turn will normally be made to initially receive an excess of liquid over and above the metered quantity of liquid which it is adapted to discharge, and such excess of liquid is then discharged gradually over a metering edge or edges 70— 70 which are concentric to the center of curvature C of the vane 52 and of sufficient angular extent to permit overflow of liquid throughout a substantial portion of the rotary movement of the wheel as the entrapped liquid is rotated around the arcuate bucket bottom defined by the vane from the radially-outer extremity thereof toward the discharge opening 58.

The forward or radially-outer end of each arcuate metering edge 70 merges tangentially with the inner end of one of the rectilinear edges 56a of the bucket mouth, and is so spaced and located relative to the arcuate vane 52 as to move through the lower-most portion of its path of travel and permit overflow of the entrapped excess of liquid only after the said merging end edges of the inlet mouth or opening have rotated upwardly past their horizontal position. At its rear or radially-inner end, each metering edge 70 terminates preferably by merger with the arcuate inner end edge 72 of the mouth 56 to discontinue overflow of the liquid no later than the time the metered volume of liquid is elevated to a position level with the lower edge of the discharge opening 58.

By virtue of the parallel relationship of the opposite end walls of each bucket and the uniform arcuate curvature of its bottom 52, the bucket defines an arcuate passage of uniform cross-sectional area, tending to maintain a given volume of liquid at a constant depth despite angular movement of the bucket. By draining off the excess liquid from each bucket, over the metering edges 70, the volumes of liquid in the buckets are metered accurately and uniformly before discharge.

Also, it has been found possible to maintain a substantially-constant rate of discharge of liquid from the wheel throughout each revolution thereof in a manner to reduce fluctuations arising from the completion of the discharge of one bucket and commencement of discharge from the next bucket. In order to achieve this, the level to which the metered liquid in each bucket is brought just prior to its discharge is such that the amount of angular movement of the wheel from the time the entrapped fluid within a given bucket is brought into communication with its associated discharge opening until it is completely discharged through such opening is substantially equal to or slightly in excess of the angular intervals between adjoining buckets. Thus, the discharge from each bucket in succession will slightly overlap that of a preceding bucket.

The discharge from the wheel 10 will thus issue in a substantially constantly-flowing stream from the spout 64 for delivery into and/or admixture with other liquids. The constant volumetric flow rate of the liquid thus discharged from the wheel will contribute to its intermixing in uniform proportion with a constantly-flowing stream of another liquid.

In the operation of the invention, during each complete revolution of the metering wheel about its rotational axis, each of the bucket vanes 52 and buckets 50 will make a complete revolution about its center of curvature C to pick up a metered charge of liquid material from the reservoir 22, raise it above the level of liquid within the reservoir and discharge it through the discharge opening 58 and outlet 64. The minimum operating level for the liquid, or in other words the minimum depth in which the wheel may be immersed without detracting from the accuracy of its metering function (as shown at $L_1$ in FIGURE 4a), will be coincident with a chordal plane extending tangentially from the metering edge portion 70 of the intake mouth or opening and coinciding with the plane of the rectilinear lower edge portions 52a, 56a of the mouth of each bucket. Thus, when the edge portions 52a, 56a of the mouth are rotated to bring them to a horizontal plane, and the liquid is at a level $L_1$ at least sufficient to flow over said edges and into the bucket, it will fill the same, including the overcharge or excess volume provided by scoop 64 at the leading edge thereof, to insure the ultimate retention and discharge of the desired amount from each bucket.

The maximum liquid level ($L_2$ in FIGURE 4a) is at a radial location on the wheel sufficiently below the discharge opening 58 as to permit the overflow of its excess or surplus contents over its arcuate metering edge portion 70 before the latter is rotated to the level of its associated discharge opening 58. It will be rseadily apparent that the invention is such as to permit substantially wide variation between these maximum and minimum operational levels of the liquid, without detracting from the accuracy of its metering function.

Having thus described my invention, I claim:

1. In a metering wheel adapted for rotation in a given direction about a horizontal axis, with its lower portion immersed in a fluid material to be metered, and in which said wheel is formed to provide a plurality of metering buckets having liquid intake and discharge openings adjacent their radially-inner and outer extremities respectively, said buckets defining generally-spiral passages for elevating and delivering measured charges of the fluid material from the said intake openings to the discharge openings, the improvement in accordance with which each bucket is provided between its intake and discharge openings with a metering edge portion disposed below a plane common to the lower extremities of said intake and discharge openings whereby to drain off excess material to a predetermined level as same passes therebeneath enroute from the intake opening to the discharge opening, to leave a carefully-measured volume of the material in said bucket for subsequent movement to and through the discharge opening thereof, the cross-sectional area and configuration of said bucket between said metering edge portion and the discharge opening being arranged to convey said measured volume of fluid material to the discharge opening while maintaining its surface at a level below that of the metering edge portion.

2. In a metering wheel as defined in claim 1, the further improvement in accordance with which the radially-outer portion of each bucket is conformed to receive a volume of fluid material in excess of that which is capable of movement past the said metering edge without overflowing same.

3. In a metering wheel as defined in claim 1, the further feature in accordance with which each bucket comprises a radially outwardly-projecting scoop portion of the metering wheel communicating with the intake opening of said bucket for delivering said excess of liquid material into the bucket when the latter is operating in liquid at a minimum level.

4. In a metering wheel as defined in claim 3, the further feature in accordance with which the bottom of each bucket is uniformly arcuately curved from said scoop portion to its associated discharge opening and is of uniform width throughout its entire length, whereby a given volume of liquid material in moving through said bucket from its intake to its discharge opening will have its surface maintained at a constant radial height with respect to said curved bottom.

5. In a metering wheel as defined in claim 1, in which the bottom of each bucket and the metering edge portion of said overflow outlet are both arcuately curved about a common center of curvature forwardly thereof in the said given direction of rotation of the wheel, each of said centers of curvature being eccentrically located relative to the rotational axis of the wheel, whereby rotation of the wheel will cause rotation of each bucket bottom and its associated metering edge around the said center of curvature of the bucket to convey the liquid material radially inwardly through each said bucket, the outer ends of the respective bucket bottoms being angularly advanced in the direction of rotation of the wheel with respect to their inner ends to roughly approximate a spiral configuration, said curvature of the bucket bottoms and the widths of the respective buckets being uniform throughout each said bucket from its discharge opening to a location adjacent its intake opening and on the remote side of said metering edge portion from the discharge opening.

6. The combination defined in claim 5, in which the radially-outer end portion of each bucket adjacent its intake opening is conformed to receive a volume of liquid material slightly in excess of that which is capable of movement past the metering edge portion of said bucket.

7. In a metering wheel as defined in claim 5, the further improvements wherein the radially-outer ends of the bucket bottoms are relatively spaced apart to define radially-directed intake openings for the respective buckets, each said bucket having parallel end walls on opposite sides of its bottom for laterally confining the contents of the buckets, said overflow outlets being formed in the end walls and including rectilinear overflow edges, the inner ends of which merge tangentially with the outer extremities of the respective metering edge portions and are disposed in common planes with the respective outer terminal edges of the bucket bottoms, whereby to facilitate the initial filling of said buckets and to effect an initial rapid discharge of any excess material from the buckets when the wheel is operating in liquid material the depth of which is such that the said rectilinear overflow edges are submerged at the time they assume horizontal positions prior to emerging outwardly from the liquid material.

References Cited

UNITED STATES PATENTS

| 609,655 | 8/1898 | Birdsall | 103—85 |
| 723,341 | 3/1903 | Toups | 103—85 |
| 2,319,830 | 5/1943 | Sampsel | 222—369 XR |
| 2,729,365 | 1/1956 | Fettkether | 220—369 XR |

FOREIGN PATENTS 300,554   9/1929   Great Britain.

ROBERT B. REEVES, *Primary Examiner.*